United States Patent Office 3,139,463
Patented June 30, 1964

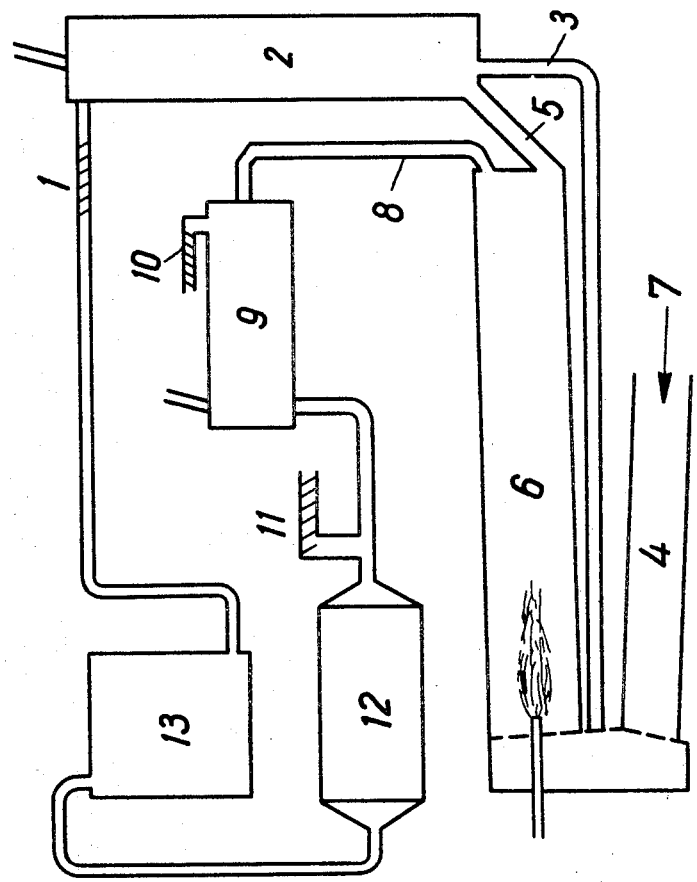

3,139,463
PROCESS FOR THE MANUFACTURE OF CEMENT
Josef Wuhrer, Wulfrath, Germany, assignor to Rheinische
Kalksteinwerke GmbH, Wulfrath, Germany, a German
corporation
Filed Aug. 17, 1960, Ser. No. 50,257
Claims priority, application Germany Aug. 22, 1959
3 Claims. (Cl. 263—53)

This invention relates to the manufacturer of cement employing raw materials containing caustic lime. More particularly this invention relates to the manufacture of cement clinker in a rotary kiln employing raw materials containing caustic lime which raw materials have been preheated prior to clinkerization.

The manufacture of cement from totally or partially burnt or calcined materials is known. In the known processes raw materials containing caustic lime are employed, such as for example, lime which has been screened and which is chiefly derived from lime works. This material is formed by screening the material falling from roasting furnace and which contains in addition to the natural impurities the ashes of the fuel and which previously had been dumped unused because of its low CaO content.

It is known that in using such raw materials a pure dry-burning process has to be employed. The raw material in finely divided form is prepared by grinding or crushing the lime residues under addition of pre-dried clay or sand or also of pre-dried blast furnace slag etc. in a typical cement mix, and is in this form charged to the furnace. The raw material cannot be charged in granulated form, because then it would be necessary to treat the same in order to make the heated product friable, whereby the CaO is hydrated to $Ca(OH)_2$. The heat dissipated in the hydration would have later to be made up in the furnace.

Furthermore, it is known that caustic lime, and especially in finely divided crushed form very readily absorbs carbondioxide.

A pre-heating of the finely divided raw material in which the finely divided raw material is exposed to the combustion gas is not practical as the $CaCO_3$ thereby formed would only have to be decomposed prior to the sintering by additional heat treatment. Such a process is rendered impractical because of the poor heat economy involved.

It has been ascertained that when such a preheating involving an intensified contact with the hot gases rich in $CO_2$ and derived from the heat treatment in the rotary kiln at a temperature within the range of between 400 and 750° C., is used a substantial part of the $CO_2$ gas is absorbed by the CaO. Approximately 18% of the CaO present in the finely divided raw materials are transformed into $CaCO_3$ in such pre-heat treatment. This has the effect that more than 100 kcal./kg.=180 B.t.u./lb. of clinker has to be supplied to accomplish the decomposition of such compounds.

Therefore, when raw materials of a finely divided nature and containing caustic lime have been employed as starting materials in the production of cement the use of pre-heaters to preheat the said raw materials have been avoided even though their use makes possible the employment of the heat of the kiln combustion gases. In the conventional processes for preparing cement from finely divided raw materials containing caustic lime, therefore, the raw material is fed directly into the rotary kiln, as thereby the contact of the combustion gases with the starting material is restricted solely to the surface of the feeding, i.e., is substantially less. The carbonization thereby taking place is practically nil.

A satisfactory utilization of the heat contained in the combustion gases as can be readily appreciated is not possible in accordance with the aforesaid process.

Furthermore, the heat of the clinker which leaves the rotary kiln at a temperature of about 1300–1400° C., can only to a small part, and namely in the form of a hot combustion air and, as far as possible as surplus air be recycled into the process. Almost half of the clinker heat is accordingly lost.

The principal object of the invention is the provision of a method for manufacturing cement from finely divided raw materials containing caustic lime which may be simply and economically carried out. A further object of the invention is the provision of a method for manufacturing cement from finely divided raw materials containing caustic lime utilizing to a substantial extent the heat available in the combustion gases. These and further objects and advantages of the invention will become apparent from the following description read in conjunction with the drawing which in a diagrammatic manner illustrates an apparatus for carrying out the process of the invention.

The process of the present invention for manufacturing cement from finely divided raw materials containing caustic lime comprises pre-heating the finely divided raw material by passing the raw material into a first heating zone wherein the raw material is subjected to the action of heated air ascending from below and passing the air pre-heated material into a second heating zone wherein the clinkerization is effected. The air necessary for pre-heating the raw material is in the preferred mode of carrying out the invention produced by bringing cold air into contact with the hot clinker whereby the air is heated. Preferably a portion of the heated air thereby produced is employed for use in the combustion of the fuel admitted into the rotary kiln comprising the second heating zone. The combustion gas produced in the rotary kiln in the formation of the cement clinker is preferably utilized in accordance with the invention for drying the sand, clay or blast furnace slag employed in the starting material mix.

In carrying out the process of the invention, the finely divided starting material in the typical cement mix which is produced by crushing or grinding clay and silicic acid or blast furnace slages after homogenization is fed to a preheater as, for instance, a suspension-gas heat-exchanger, where it is subjected to the action of hot air from below. The heated air is preferably derived from the clinker cooling. The entire air used to cool the clinker and which is thereby heated is preferably divided up into a minor portion used for the combustion of the fuel admitted into the rotary kiln and into a considerably larger portion serving for the preheating. In the process in accordance with the invention it is not necessary to employ more than the usual air excess for the combustion.

The heat of the hot combustion gases can most advantageously be employed for carrying out the drying of the clay or sand or blast furnace slags, etc., used in preparing the starting mix.

However, the hot combustion gases from the rotary kiln can also be used to heat air as in a recuperator, the air thus heated being fed to the pre-heater, and for instance can be introduced at a point at which the cooler hot air coming from below has the same temperature.

Referring to the accompanying drawing which is solely by way of illustration, there is shown an apparatus which consists basically of a pre-heater 2 arranged immediately before a furnace 6, a feed line 3 for heated air and a discharge line 5 for the heated finely divided starting material. The homogenized finely divided starting material is introduced at the top of the pre-heater 2 by the dosage device 1. The hot air coming from the clinker cooler ascends from below through the pipe 3. The pre-heated finely divided starting material flows off through pipe 5 into the rotary kiln. The resulting cement clinker drops into the clinker cooler 4 and is cooled therein by the flow f cold air directed toward it from pipe 7 whereby the cold air is heated.

The waste gas or combustion gas produced in the rotary kiln is fed through 8 into the drier 9, into which clay and/or sand and/or blast furnace slag have been admitted through feed pipe 10. The dried materials are ground together with the caustic lime admitted at 11 in the mill 12 and the resulting pulverulent starting cement mix is homogenized in homogenizer 13.

With the process and arrangement of apparatus as herein taught it is possible, in contrast to the conventional processes for burning finely divided raw materials in rotary kilns without the use of a preheater, to decrease by about 25% the consumption of heat. In contrast to the known processes, in which the rotary kiln combustion gases are used to preheat the starting material, the heating saving in accordance with the invention amounts to 40%.

*Example*

| A mixture of | Percent by weight |
|---|---|
| Caustic lime | 73.5 |
| Dry clay | 19.1 |
| Quartz sand | 7.4 | the chemical composition of which is shown in Table 1.

|  | Lime, percent | Clay, percent | Sand, percent |
|---|---|---|---|
| $CaO$ | 86.0 | 0.5 | 97.0 |
| $SiO_2$ | 7.2 | 60.1 | 1.1 |
| $Al_2O_3$ | 2.5 | 25.3 | 1.9 |
| $Fe_2O_3$ | 1.6 | 7.8 |  |
| $MgO$ | 1.1 |  |  |
| Glowing loss | 1.2 | 6.0 |  | are pulverised in a ball mill so that the powder has not more than 6% residue on the ASTM Sieve No. 170. This powder is continuously brought into a heat exchanger fed by exhaust hot air of the below mentioned clinker cooling device, thus the powder being brought to a temperature of about 500° C. The hot air coming in at temperature of 620° C. leaves the heat exchanger at about 170° C. The heated powder passes from the heat exchanger immediately into a rotary kiln, the hot zone of which may have a temperature of 1400–1500° C. After remaining in the kiln for about 2 hours the powder is burnt to clinker.

The clinker is discharged from the kiln into a cooling device fed by cold air in an amount of 26 cu. ft. of air per lb. of clinker, so that the clinker is cooled down unto 160° C. and the air is heated up unto 650° C. A part of 20% of this exhaust hot air is introduced into the kiln, the other 80% are introduced into the above mentioned heat exchanger for the reason of heating the powder. The clinker produced according to this process at an industrial scale had a composition as follows:

$CaO=64.1\%$, $SiO_2=24.1\%$, $Al_2O_3=7.0\%$, $Fe_2O_3=3.1\%$, $MgO=0.8\%$, $Na_2O+K_2O=0.5\%$, $SO_3=0.3\%$.

The heat consumption was 485 B.t.u./lb. clinker.

I claim:
1. A process for the manufacture of cement clinker in a rotary kiln employing finely divided raw material containing free caustic lime comprising preheating a mixture of at least one member selected from the group consisting of clay, sand and blast furnace slag, together with free caustic lime, with heated air immediately before burning by contacting said raw material with heated air and thereafter burning the material thus heated in a rotary kiln, wherein said member, prior to the addition thereof to the free caustic lime, is dried by subjecting said member to direct heat exchange contact with the hot combustion gas from the rotary kiln.

2. Process according to claim 1, which comprises cooling the hot cement clinker by contacting the same with cold air and thereafter utilizing at least a part of the air heated thereby for the preheating of the finely divided raw material.

3. Process according to claim 1, which comprises cooling the hot cement clinker by contacting the same with cold air and thereafter utilizing a part of the air heated thereby for the preheating of the finely divided raw material and the balance of the heated air for the combustion in said rotary kiln.

References Cited in the file of this patent

UNITED STATES PATENTS

| 1,468,168 | Pike | Sept. 18, 1923 |
| 1,904,699 | Singmaster | Apr. 18, 1933 |
| 2,125,263 | Ahlmann | Aug. 2, 1938 |
| 2,157,321 | Bussmeyer | May 9, 1939 |